US007240051B2

(12) United States Patent
Imaichi et al.

(10) Patent No.: US 7,240,051 B2
(45) Date of Patent: Jul. 3, 2007

(54) DOCUMENT SEARCH SYSTEM USING A MEANING RELATION NETWORK

(75) Inventors: Osamu Imaichi, Wako (JP); Hiroyuki Kaji, Tama (JP)

(73) Assignee: Hitachi, Ltd., Tokyo (JP)

( * ) Notice: Subject to any disclaimer, the term of this patent is extended or adjusted under 35 U.S.C. 154(b) by 499 days.

(21) Appl. No.: 10/784,768

(22) Filed: Feb. 24, 2004

(65) Prior Publication Data

US 2004/0181520 A1 Sep. 16, 2004

(30) Foreign Application Priority Data

Mar. 13, 2003 (JP) ............... 2003-068505

(51) Int. Cl.
*G06F 7/00* (2006.01)
*G06F 17/30* (2006.01)
(52) U.S. Cl. .......................... 707/3; 395/605
(58) Field of Classification Search ............... 707/1–6; 715/501; 704/257, 277; 395/605
See application file for complete search history.

(56) References Cited

U.S. PATENT DOCUMENTS

| | | | | |
|---|---|---|---|---|
| 5,634,051 A | * | 5/1997 | Thomson ................. | 707/5 |
| 6,665,640 B1 | * | 12/2003 | Bennett et al. ........... | 704/257 |
| 6,675,159 B1 | * | 1/2004 | Lin et al. ................. | 707/3 |
| 6,862,710 B1 | * | 3/2005 | Marchisio ................ | 715/501.1 |
| 2001/0029455 A1 | * | 10/2001 | Chin et al. ............... | 704/277 |
| 2003/0115191 A1 | * | 6/2003 | Copperman et al. ...... | 707/3 |
| 2005/0091204 A1 | * | 4/2005 | Melman ................... | 707/3 |
| 2005/0108200 A1 | * | 5/2005 | Meik et al. ............... | 707/3 |
| 2005/0114322 A1 | * | 5/2005 | Melman ................... | 707/3 |

FOREIGN PATENT DOCUMENTS

| | | |
|---|---|---|
| JP | 05-151253 | 11/1991 |
| JP | 11-45268 | 7/1997 |
| JP | 10-222540 | 12/1997 |
| JP | 2001-331484 | 5/2000 |
| JP | 2002-230021 | 1/2001 |
| JP | 2002-251412 | 2/2001 |

* cited by examiner

*Primary Examiner*—Don Wong
*Assistant Examiner*—Hung Tran Vy
(74) *Attorney, Agent, or Firm*—Reed Smith LLP; Stanley P. Fisher, Esq.; Juan Carlos A. Marquez, Esq.

(57) ABSTRACT

A system allows related documents to be retrieved using conventional search engines while overcoming the ambiguity of a search key entered by the user. The system includes a word sense associative network display portion for displaying word senses of the search key entered by the user together with related word senses in a network, a search portion for conducting a search by generating a search key based on word senses selected by the user, and a filtering portion for selecting documents from the result of the search that matches the selected word sense.

6 Claims, 5 Drawing Sheets

FIG.2A

| TERM | WORD SENSE |
|---|---|
| tank | tank/tanku/suiso |
| tank | tank/sensha |

FIG.2B

| WORD SENSE | WORD SENSE | RELEVANCE |
|---|---|---|
| tank/tanku/suiso | ammonia/anmonia | 4.834 |
| tank/tanku/suiso | fuel/nenryo | 2.954 |
| tank/tanku/suiso | toilet/senjo | 2.737 |
| tank/sensha | artillery/hou | 4.044 |
| tank/sensha | ball/houdan | 2.675 |
| tank/sensha | commander/shidohsha | 2.646 |

FIG.2C

| TERM | TERM | RELEVANCE | WORD SENSE |
|---|---|---|---|
| tank | ammonia | 0.169 | tank/sensha |
| tank | ammonia | 4.834 | tank/tanku/suiso |
| tank | artillery | 4.044 | tank/sensha |
| tank | artillery | 0.063 | tank/tanku/suiso |

1. Ammonia-based Hydrogen...

...The 0.8-liter ammonia storage *tank* will hold up to 480 grams of anhydorous ammonia, which will yield about 1150 Wh of energy from a fuel cell...

2. Carbon Fiber Tank Protector

...*tank* protectors, dampers, undertails, custom, brakelines, brakes, front, front fenders, videos, shirts, patches, huggers, toilet seat, carbon fiber, fuel cap...

3. ....

DOCUMENT SEARCH SYSTEM USING A MEANING RELATION NETWORK

BACKGROUND OF THE INVENTION

1. Technical Field

The present invention relates to a document search system for the retrieval of related documents using the meaning reflecting the user's search intentions.

2. Background Art

With the spread of computers and the Internet, more and more document information is being made available in electronic form at a rapid pace. As the amount of available document information increases, it becomes important how to search for and retrieve necessary information. Information (or document) search is the art of solving such a problem, and the art is commonly practiced in the form of document information retrieval using search engines. In recent years, there is also a growing need for cross-lingual (or cross-language) document search techniques by which documents written in a language different from that of a search key entered by the user are searched.

In a monolingual document search, target documents written in the same language as that of the search key entered by the user are searched. On the other hand, in the cross-lingual document search, because the search key entered by the user and the documents that are searched are written in different languages, the search key must be translated into the language of the searched documents. For example, in the case of an English-to-Japanese cross-lingual document search where an English search key is entered in order to search Japanese documents, the user enters an English search key (such as "camera"), which is translated into a corresponding Japanese search key (such as the Japanese "kamera") with which the Japanese documents are searched.

[Patent Document 1] JP Patent Publication (Kokai) No. 2001-331484 A

SUMMARY OF THE INVENTION

Generally, however, words have multiple meanings, and a given search key is not always uniquely translatable into the language of the searched material. For example, when the English word "bank" is translated into Japanese, one realizes that the English word has multiple meanings, such as "an institution that keeps and lends money" (corresponding to the Japanese "ginko") and as "a land along the side of a river" (corresponding to "kishi"). Therefore, the English word could be translated into a word with a different meaning than that intended by the user unless the desired meaning of the original word is clarified. If that happens, documents that are of no interest to the user could be included in the search result.

Similar problem can occur in the monolingual document search too, such as when the search key entered by the user have multiple meanings. This would produce search results containing documents related to the word meanings that are not intended by the user. Consider, for example, the case where the English word "tank" is entered as the search key in a monolingual document search. In this case, because the word "tank" has meanings such as one corresponding to the Japanese words "tanku" or "suiso" ("container" or "cistern") and another meaning corresponding to "sensha" (the military vehicle), the obtained search results could contain documents related to containers and cisterns even if the user's interest was the military vehicle.

Thus, when the search key has multiple meanings, the user's intention cannot be reflected in the document search unless his or her intended meaning is specified.

It is therefore the object of the present invention to provide a document search system that can overcome the problem caused by the ambiguity inherent in the search key and allow search results to be produced that reflect the user's search intention.

In order to achieve the above object, the user is presented with a word sense associative network in which the word senses of a search key entered by the user and word senses related to the word senses of the search key are arranged in a network. The user is asked to select one or more of the multiple word senses that reflects the user's intention, thus clarifying his or her search intentions.

The word senses displayed in the word sense associative network are defined as sets of words (or terms) in different languages (such as English and Japanese). For example, the English word "bank" means an institution that keeps and lends money ("ginko") and also means a land along the side of a river ("kishi"). In this case, sets of words "bank/ginko" and "bank/kishi" are defined as the meanings of the word "bank". In the word sense associative network, the thus-defined meanings form nodes and the degrees of relevance between these meanings form links in a network structure. The word sense associative network may be made by any desired method, such as, for example, a method described in JP Patent Publication (Kokai) No. 2001-331484 A entitled "RECORDING MEDIUM IN WHICH A PARALLEL THESAURUS-GENERATING PROGRAM IS RECORDED, RECORDING MEDIUM IN WHICH A PARALLEL THESAURUS IS RECORDED, AND RECORDING MEDIUM IN WHICH A PARALLEL THESAURUS NAVIGATION PROGRAM IS RECORDED." The "parallel thesaurus" referred to in this method corresponds to the word sense associative network of the present invention.

By having the user select a meaning from the word sense associative network, the user's search intention can be clarified. However, the present invention employs a common search engine with a keyword search function, such as Google (http://www.google.com) or goo (http://www-.goo.ne.jp), in which terms rather than meanings are accepted. Namely, in these search engines, the user cannot specify the meaning of a term as a search key. Therefore, the user has had to conduct a search using a term as a key without identifying its meaning, which typically resulted in search results containing documents that are not related to the meaning intended by the user. In accordance with the invention, a filtering process is performed in which the meaning of the term contained in the documents in the search result is determined, and only those documents are selected in which the term is used with the user-specified word sense. Thus, the user can be presented with search results that reflect his or her search intensions.

The invention provides a document search system for the retrieval of documents related to a search key that is entered, the system comprising: a word sense associative network presenting portion for presenting word senses of the search key together with their related word senses in a network; a search portion for conducting a search using the search key; and a filtering portion for selecting documents from a set of documents obtained as a result of the search that matches selected word senses. The word sense associative network presenting portion presents the word senses in a network such that the user can be prompted to select word senses.

The search portion may either conduct a search using the search key that is entered, or generate a search key based on selected word senses and then conduct a search using the thus generated search key. The search portion may conduct a cross-lingual document search in which the search portion searches documents written in a language different from that of the search key that is entered. Alternatively, the search portion may conduct a monolingual document search in which the search portion searches documents written in the same language as that of the search key that is entered.

BRIEF DESCRIPTION OF THE DRAWINGS

FIG. 2 shows an example of tables contained in a word sense association database.

FIG. 6 shows an example of the display of search results on the client.

DESCRIPTION OF THE PREFERRED EMBODIMENTS

Representative embodiments of the present invention include (1) a monolingual document search in which documents written in the same language as that of the search key entered by the user are searched; and (2) a cross-lingual document search in which documents written in a language different from that of the search key entered by the user are searched. The language of the search key and that of the searched documents may be a combination of any languages. In the following, the embodiment (1) will be described with reference to a case where English documents are searched based on an English search key, while in the description of the embodiment (2), English documents are searched based on a Japanese search key.

Hereafter, the embodiment (1) will be described with reference to the drawings.

Figure 1:
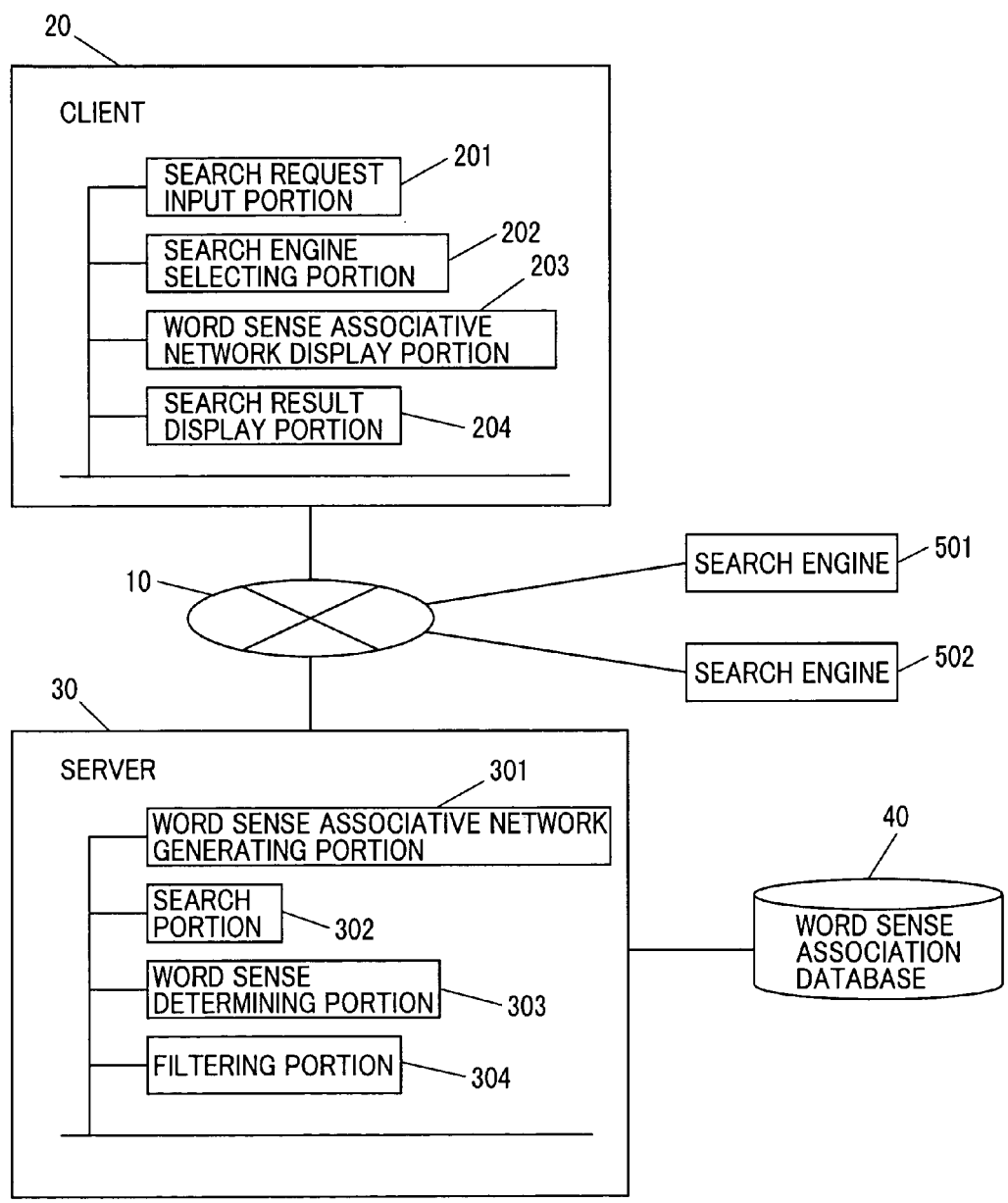
FIG. 1 shows an example of the configuration of a system for realizing the invention.

FIG. 1 schematically shows an example of the configuration of a system for realizing the invention. This system is made up of a client 20, a server 30, a word sense association database 40, and search engines 501 and 502. The client 20, server 30 and search engines 501 and 502 are connected via a communication network 10. While in the illustrated example there are two search engines connected to the communication network, the number of search engines used is not particularly limited. The number of clients is also arbitrary.

The client 20 includes a search request input portion 201, a search engine selection portion 202, a word sense associative network display portion 203, and a search result display portion 204. The function of each portion will be described later.

The server 30 includes a word sense associative network generating portion 301, a search portion 302, a word sense determination portion 303 and a filtering portion 304. The function of each portion will be described later.

The word sense association database 40 is a database for storing information about meanings, and it includes (a) a table for storing information about meanings a particular word (term) has, (b) a table for storing information about the degree of relevance between individual meanings, and (c) a table for storing information about which meaning a particular term 1 is most likely to assume when it appears with another term 2.

FIG. 2 shows an example of the tables contained in the word sense association database 40. FIGS. 2(a), (b) and (c) correspond to the above-mentioned (a), (b) and (c). FIG. 2(a) shows that the term "tank" has two meanings, namely "tank/tanku/suiso" and "tank/sensha." FIG. 2(b) shows that the relevance between the meaning "tank/tanku/suiso" and another meaning "ammonia/anmonia" is 4.834, while that between the meanings "tank/sensha" and "artillery/hou ("gun")" is 4.044, for example. FIG. 2 (c) shows that when the term "tank" appears together with the term "ammonia," the term "tank" is more likely to assume the meaning "tank/tanku/suiso" than the other meaning "tank/sensha" (as will be seen by comparing their relevances 0.169 and 4.834). Likewise, when the term "tank" appears with "artillery", the term is more likely to assume the meaning "tank/sensha" than "tank/tanku/suiso" (as will be seen by comparing their relevances 0.063 and 4.044). This table is used in the word sense determination portion 303 when determining the meaning a term of interest assumes in a document. The function of the determining portion 303 will be described later.

The search engines 501 and 502 are common search engines with a keyword search function, such as Google (http://www.google.com) or goo (http://www.goo.ne.jp).

Figure 3:
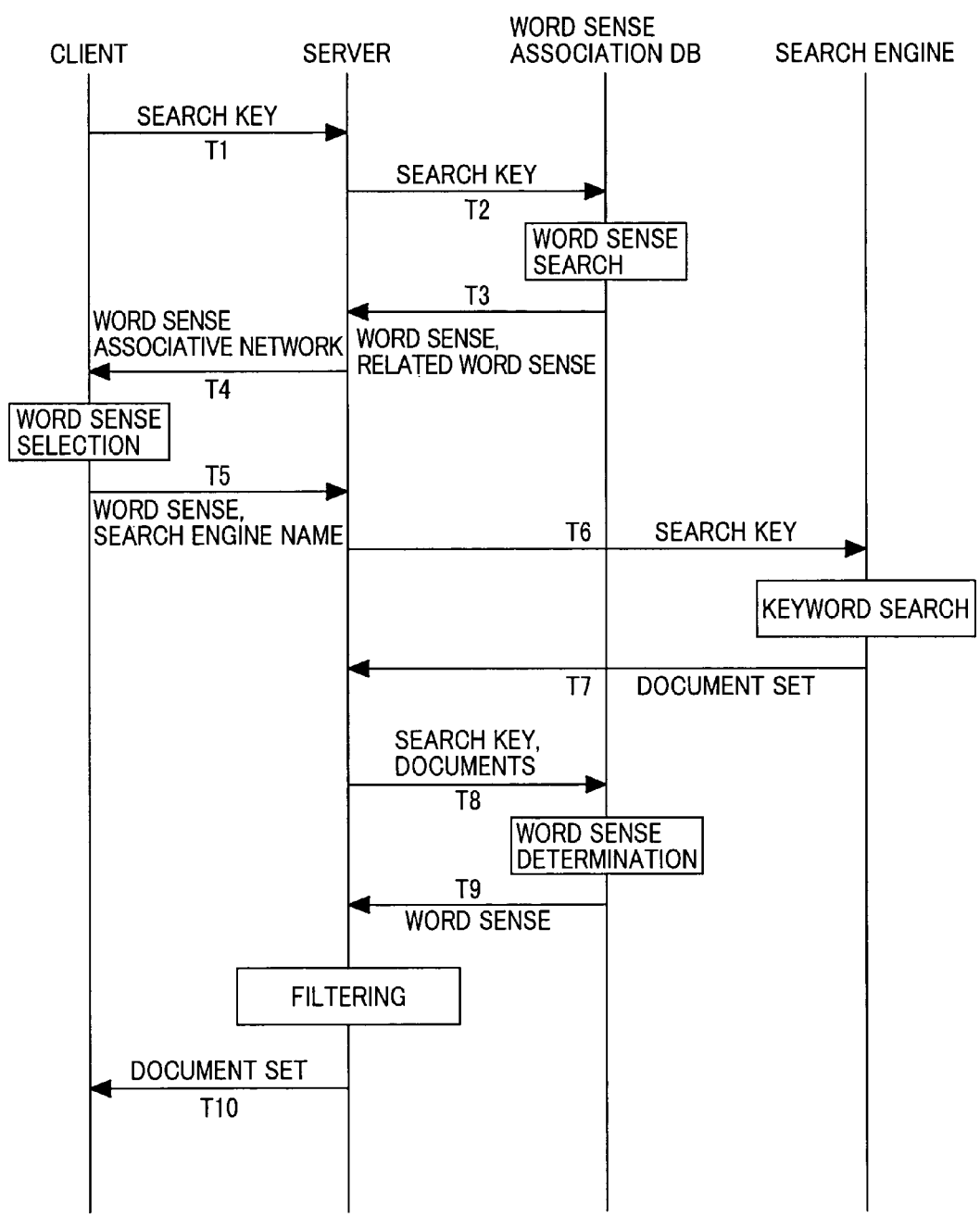
FIG. 3 shows a sequence chart illustrating the flow of data and processes performed between a client, server, word sense association database and search engine.
Figure 4:
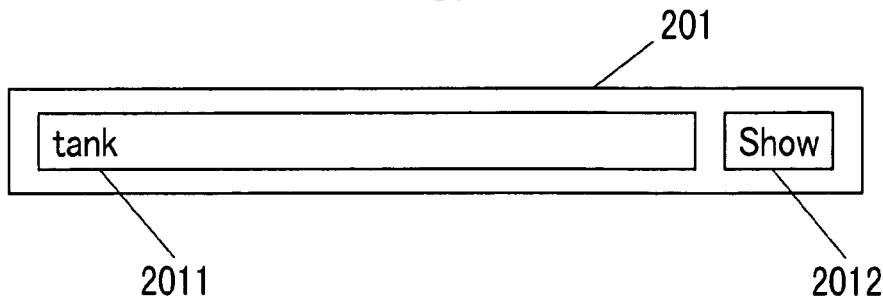
FIG. 4 shows an example of the initial screen on the client.
Figure 5:
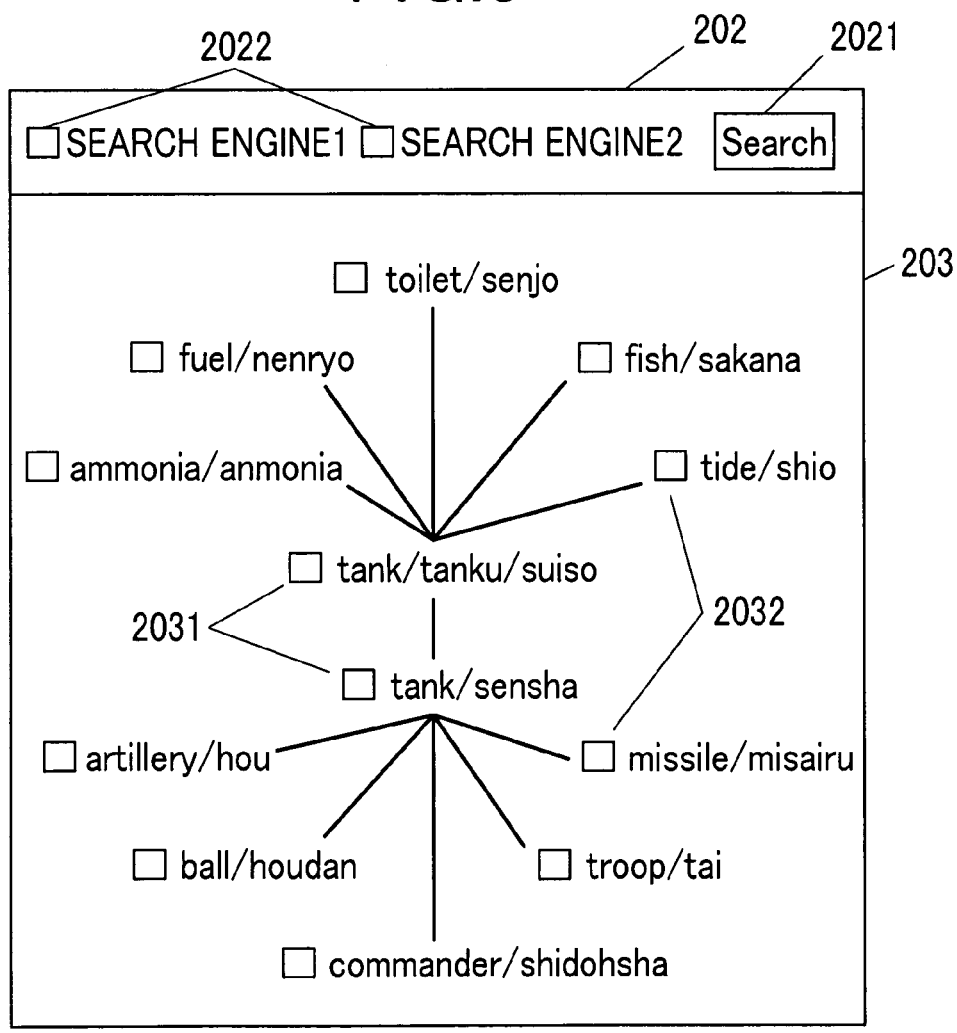
FIG. 5 shows an example of the display of a word sense associative network in the client.

Hereafter, the function of each of the aforementioned portions will be described in detail by referring to FIG. 3 showing a sequence chart illustrating the flow of data and processes between individual portions, to FIGS. 4 to 6 showing examples of the screen on the client, and to FIG. 2 showing the examples of the tables contained in the word sense association database.

FIG. 4 shows an example of the initial screen of the client 20. The search request input portion 201 includes a search request input area 2011 and a word sense associative network display instructing button 2012. For example, when an English search key "tank" is entered in the search request input area 2011 and then the word sense associative network display instructing button 2012 is clicked, the entered search key "tank" is transmitted to the word sense associative network generating portion 301 of the server 30 (T1 in FIG. 3).

The word sense associative network generating portion 301 searches the word sense association database 40(a) and (b) for the word senses of the search key "tank" and word senses (related word senses) with a high degree of relevance to that word sense (T2 and T3 in FIG. 3), in order to generate the word sense associative network. The number of related word senses that are retrieved may be arbitrarily determined; 5 should be appropriate.

The thus generated word sense associative network is then transmitted to the client 20 (T4 in FIG. 3), and is then displayed on the word sense associative network display portion 203 of the client 20, as shown in FIG. 5. By looking at the thus displayed word sense associative network, the user can learn that the search key "tank" has two meanings "tank/tanku/suiso" and "tank/sensha", that the meaning "tank/tanku/suiso" is related to the meanings such as "ammonia/anmonia" and "fuel/nenryo ("fuel")", and that the meaning "tank/sensha" is related to the meanings such as "artillery/hou" and "ball/houdan ("cannonball")". The user is further allowed to select one or more of the meanings possessed by the search key, using the word sense selection button 2031 on the word sense associative network display portion 203. Further, the user can select related word senses with which he or she wishes to conduct a search together with word senses of the search key, using a related word sense selection button 2032.

Then, the user selects the search engine as the searched object using the search engine selection button 2022 on the search engine selection portion 202 of the word sense associative network display portion 203, and then clicks the search instructing button 2021. The information about the selected word sense and the related word sense is transmitted to the search portion 302 of the server 30 (T5 of FIG. 3). At the same time, the name of the search engine selected as the searched object is transmitted.

The search portion 302 generates a search key based on the meanings that have been transmitted such that the search key can be accepted by the search engine. For example, a search key "tank" is generated based on the meaning "tank/tanku/suiso." Using the thus generated search key, the search engine is searched (T6 of FIG. 3), and documents related to the search key are obtained (T7 of FIG. 3). Because the resultant set of documents has not been retrieved using the meaning of the user's intention, namely "tank/tanku/suiso" but based on the term "tank," the set contains results that do not satisfy the user's intension. Therefore, those documents must be selected from the set of documents obtained as the search result in which the term "tank" is used with the meaning of the user's intension. As a preliminary process for such a document selection, the word sense determination portion 303 determines with which meaning the term "tank" contained in the documents obtained in the search result is used.

The word sense determination portion 303 performs the word sense determination using the table (c) in the word sense association database 40 (T8 and T9 in FIG. 3). For example, when the term "tank" appears together with the term "ammonia" in a document in the search result, it is more likely that the term "tank" in this document is used with the meaning "tank/tanku/suiso" (as will be seen by comparing the relevance values 0.169 and 4.834). Similarly, the relevance between the term "tank" and each of the terms that appear together with the term "tank" is evaluated, in order to determine the meaning of the term "tank." Such a word sense determination is conducted on each of the documents obtained as the search result.

The filtering portion 304 selects only those documents from the set of documents that have been subjected to word sense determination in which the term "tank" is used with the meaning that satisfies the search intension of the user, and transmits the resultant set of documents to the client 20 (T10 in FIG. 3).

The set of documents that has been transmitted is displayed on the search result display portion 204 of the client 20. FIG. 6 shows an example of the display of the search result. The format of the display of the search result may simply be based on a list of the titles of the documents obtained as the search result. Alternatively, however, a part of the main document may be displayed in addition to its title, and the search key or the terms used in word sense determination that appear in the displayed main document may be shown with emphasis, as shown in FIG. 6. In FIG. 6, the search key "tank" is italicized while the terms "ammonia," "fuel" and "toilet" that have been used for word sense determination are emphasized with a bold type.

By using the above-described system, the user can obtain those documents from the related documents retrieved with a search key entered by the user in which the search key is used with the meaning as intended by the user.

During the search of the search engine (T6 in FIG. 3), the search portion 302 of the server 30 may search the search engine using the search key (T1 in FIG. 3) that has been transmitted from the client 20 for the first time, instead of the search key generated on the basis of the meaning information transmitted from the client 20. In this case too, a word sense determination can be conducted by the word sense determination portion 303 on the search key contained in each document in the set of documents obtained by a search, and those documents can then be selected by the filtering portion 304 in which the search key is used with the meaning intended by the user. Thus, a search result can be produced which reflects the user's search intentions.

The above has been the description of the embodiment of the invention where English documents are searched using an English search key (monolingual document search). Hereafter, the embodiment (2), which is a variation of the embodiment (1), will be described, in which English documents are searched using a Japanese search key (cross-lingual document search).

In order to realize the embodiment (2), a table must be provided in the word sense association database 40 in which information about the meanings of Japanese terms is stored. For example, the meaning of the Japanese term "sensha" is "tank/sensha," and the meaning of the Japanese term "nenryo" is "fuel/nenryo," and therefore these pieces of information can be stored. Such a table can be created in the same manner as when the table (a) in the word sense association database 40 in the embodiment (1) is created.

The flow of processes in the embodiment (2) is substantially the same as that in the embodiment (1). In the embodiment (2), however, when the meaning of the search key entered by the user (such as "sensha") is searched for by the word sense associative network generating portion 301, the table in which the aforementioned information about the meanings of the Japanese terms stored can be searched. As a result, the meaning of the search key can be obtained (such as "tank/sensha"). Thereafter, the same processes as those in the embodiment (1) are carried out.

The embodiment (2) has the following advantages. In the conventional cross-lingual document search, the search key that is entered is translated in a bilingual dictionary, and then documents are searched. For example, when a Japanese search key "sensha" is entered, the search key is translated in a bilingual dictionary into "tank," and a search is conducted on documents using "tank." However, as mentioned above, "tank" has multiple meanings, so that the search can also pick up documents in which the term "tank" is used with meanings other than that intended by the user. In the embodiment (2), however, the meaning of the term "tank" is identified as "tank/sensha," so that the user can be presented with documents in which the term "tank" is used with the meaning of "sensha," as intended by the user despite the ambiguity of the term "tank."

In accordance with the invention, the user is allowed to select one or more of the meanings displayed on the word sense associative network before conducting a search, so that the user can be presented with search results in which his or her search intentions are reflected.

What is claimed is:

1. A document search system for the retrieval of documents related to a search key, comprising:
   a database in which terms, corresponding meanings, relevance between the meanings, and relevance between the terms with respect to each corresponding meaning are stored;

a search key input unit for entering by a user a first term as a search key;

a meaning-relation network presenting unit by which a plurality of different meanings of said search key and a second term related to each of said meanings of said search key are extracted from the database and presented in a form of a network;

a meaning selecting means for selecting by the user at least one meaning of the first term in the network presented by the meaning-relation network presenting unit;

a search unit conducting a document search using said search key;

a meaning determination unit for determining a meaning of the search key used in a searched document by the search unit, by referring to the database; and a filtering unit selecting a document from a set of searched documents as determined by the meaning determination unit in which said search key is used with said at least one meaning selected by the meaning selecting means, wherein the first term and each of said different meanings are paired and displayed side by side as one first node in the network, said second term is displayed as a second node linked to said first node via a line in the network, and said second term and a meaning of the second term are paired and displayed side by side as said second node in the network.

2. The document search system according to claim 1, wherein said search unit generates a search key based on a selected meaning selected by the meaning selecting means, and conducts a search using the generated search key.

3. The document search system according to claim 2, wherein said search unit conducts a cross-lingual document search whereby a document written in a language different from that of the entered search key is retrieved.

4. The document search system according to claim 2, wherein said search unit conducts a monolingual document search whereby a document written in the same language as that of the entered search key is retrieved.

5. The document search system according to claim 1, wherein said search unit conducts a cross-lingual document search whereby a document written in a language different from that of the entered search key is retrieved.

6. The document search system according to claim 1, wherein said search unit conducts a monolingual document search whereby a document written in the same language as that of the entered search key is retrieved.

* * * * *